(12) United States Patent
Förster

(10) Patent No.: US 11,946,527 B2
(45) Date of Patent: Apr. 2, 2024

(54) VIBRATION DAMPER HAVING A PUMP ASSEMBLY

(71) Applicant: ZF Friedrichshafen AG, Friedrichshafen (DE)

(72) Inventor: Andreas Förster, Schweinfurt (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 178 days.

(21) Appl. No.: 17/521,175

(22) Filed: Nov. 8, 2021

(65) Prior Publication Data

US 2022/0154798 A1    May 19, 2022

(30) Foreign Application Priority Data

Nov. 13, 2020    (DE) .......................... 102020214277.7

(51) Int. Cl.
*F16F 9/516*    (2006.01)
*B60G 13/08*    (2006.01)
(Continued)

(52) U.S. Cl.
CPC .......... *F16F 9/516* (2013.01); *F04B 11/0033* (2013.01); *F15B 1/021* (2013.01);
(Continued)

(58) Field of Classification Search
CPC .......... F16F 9/516; F16F 9/19; F16F 2222/12; F16F 2228/066; F16F 2230/06; F16F 2232/08; F16F 2234/02; F16B 2201/21; F16B 1/021; F16B 1/04; F16B 1/26; B60G 13/08; B60G 17/08; B60G 2202/24; B60G 2204/62; B60G 2206/41; B60G 2500/104; B60G 2800/162

See application file for complete search history.

(56) References Cited

U.S. PATENT DOCUMENTS 4,786,034 A * 11/1988 Heess ...................... F16F 9/46
                                                188/312
5,678,847 A * 10/1997 Izawa .................. B60G 15/063
                                               280/5.515

(Continued)

FOREIGN PATENT DOCUMENTS

| DE | 3902743 C1 | 7/1990 |
| DE | 19524965 A1 | 1/1997 |
| DE | 102007001485 A1 | 7/2008 |

*Primary Examiner* — Robert A. Siconolfi
*Assistant Examiner* — James K Hsiao
(74) *Attorney, Agent, or Firm* — Kristin L. Murphy

(57) ABSTRACT

A vibration damper comprising a working cylinder, which is subdivided by an axially movable piston on a piston rod into a first and a second working chamber filled with a damping medium is disclosed. The vibration damper has at least one compensating reservoir for receiving the damping medium displaced by the piston rod. There is a flow connection between the two working chambers, in which connection there is incorporated a pump assembly. The pump assembly has a fluctuation in the delivery volume with a constant power supply. At least one pulsation accumulator is arranged within the flow connection, wherein the volume and spring rate of the pulsation accumulator are matched to a frequency of a fluctuation of the delivery volume of the pump assembly.

18 Claims, 5 Drawing Sheets

(51) Int. Cl.
*F04B 11/00* (2006.01)
*F15B 1/02* (2006.01)
*F15B 1/04* (2006.01)
*F15B 1/26* (2006.01)
*F16F 9/19* (2006.01)
*B60G 17/08* (2006.01)

(52) U.S. Cl.
CPC .............. *F15B 1/04* (2013.01); *F15B 1/26* (2013.01); *F16F 9/19* (2013.01); *B60G 13/08* (2013.01); *B60G 17/08* (2013.01); *B60G 2202/24* (2013.01); *B60G 2204/62* (2013.01); *B60G 2206/41* (2013.01); *B60G 2500/104* (2013.01); *B60G 2800/162* (2013.01); *F15B 2201/21* (2013.01); *F16F 2222/12* (2013.01); *F16F 2228/066* (2013.01); *F16F 2230/06* (2013.01); *F16F 2232/08* (2013.01); *F16F 2234/02* (2013.01)

(56) References Cited

U.S. PATENT DOCUMENTS

| | | | | |
|---|---|---|---|---|
| 5,682,968 | A * | 11/1997 | Boichot | B61F 5/245 188/266.2 |
| 7,229,079 | B2 * | 6/2007 | Platner | B60G 17/0416 280/5.515 |
| 8,585,062 | B2 * | 11/2013 | Hunter | H02K 7/1876 280/5.514 |
| 2002/0070510 | A1 * | 6/2002 | Rogala | B60G 13/14 280/6.153 |
| 2005/0184477 | A1 * | 8/2005 | Platner | B60G 17/0152 280/5.515 |
| 2006/0196740 | A1 * | 9/2006 | Kirchner | F16F 9/5123 188/266.2 |
| 2007/0137913 | A1 * | 6/2007 | Wohanka | B60G 15/12 180/197 |

* cited by examiner

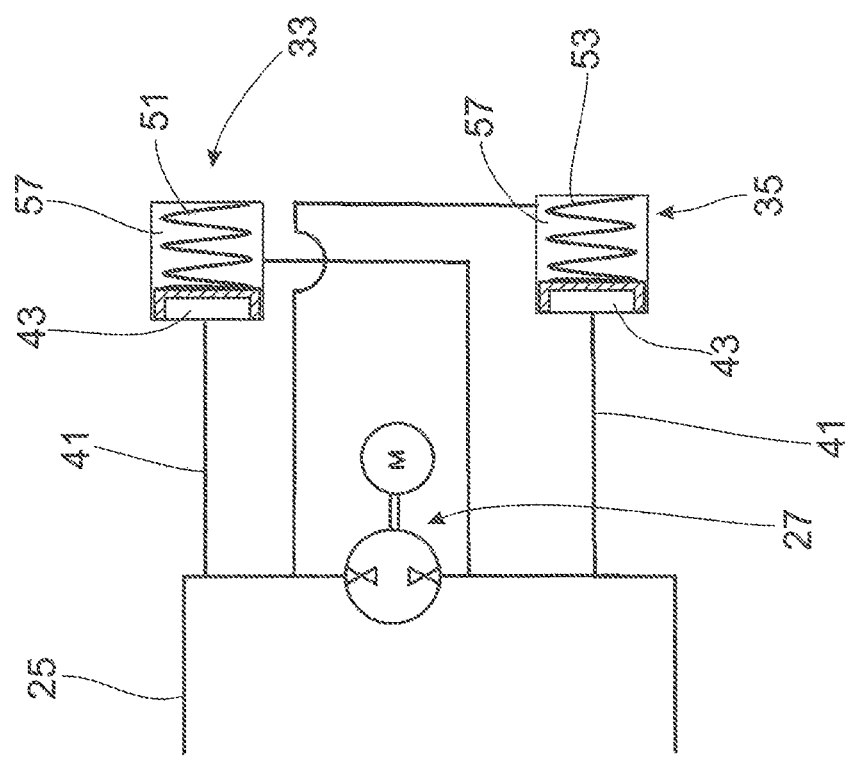

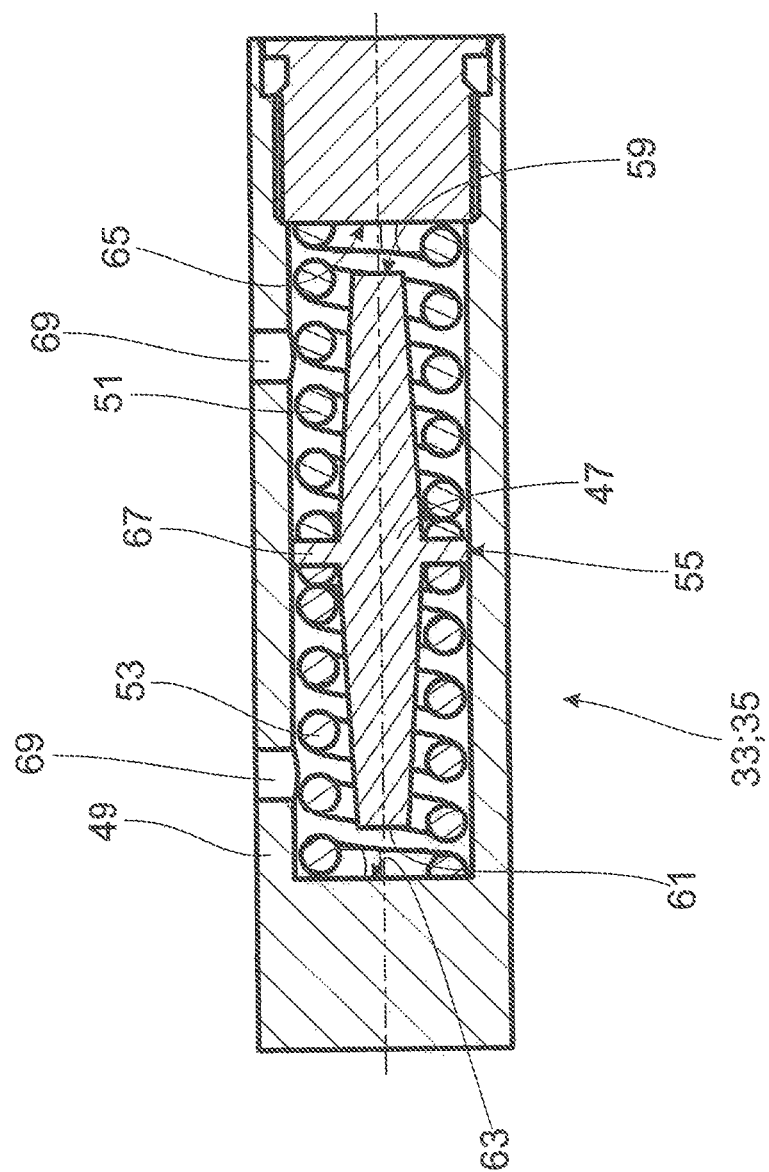

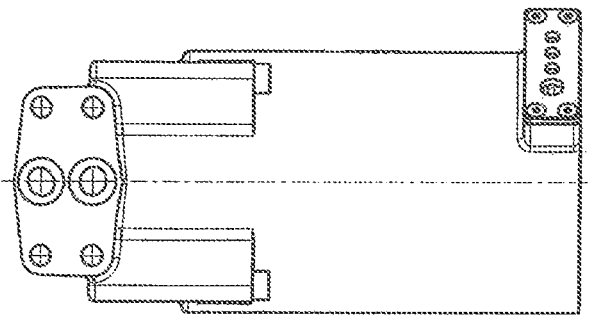
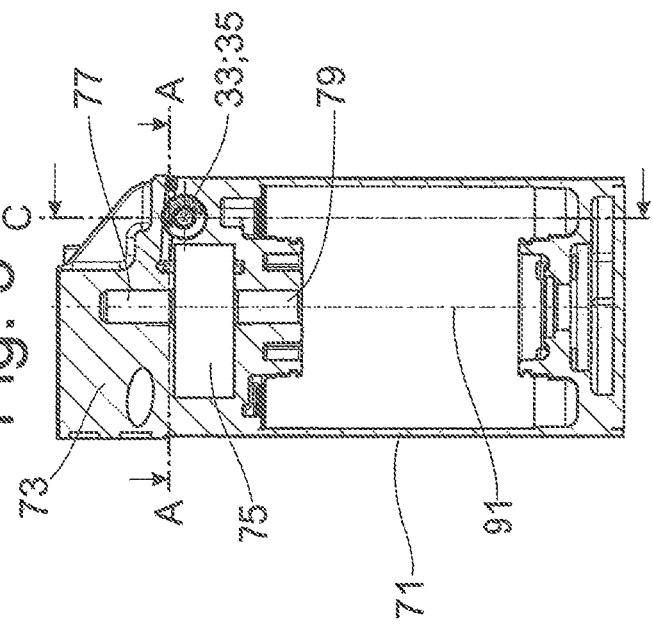
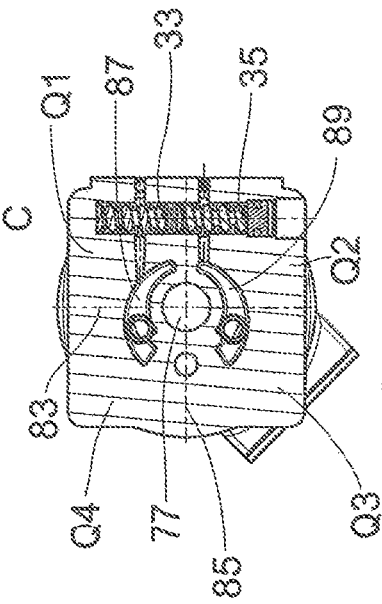
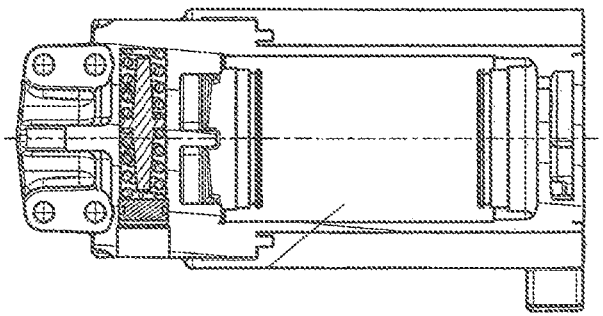

VIBRATION DAMPER HAVING A PUMP ASSEMBLY

CROSS-REFERENCE TO RELATED APPLICATION

This application claims priority to German Patent Application No. 102020214277.7, filed Nov. 13, 2020, the disclosure of which is incorporated herein by reference in its entirety.

TECHNICAL FIELD

The disclosure relates to a vibration damper.

BACKGROUND

DE 10 2011 101 746 A1 discloses a vibration damper which has a pump assembly within a flow connection between two working chambers. The pump assembly has two delivery directions. Within a piston, which is fastened to a piston rod 7, in the shown in FIG. 3, a hydraulic backlash is embodied, which serves to damp excitations below a defined amplitude. The hydraulic backlash comprises a damping medium compensation chamber with an axially movable separating piston. Such damping medium compensation chambers are often also used in conventional vibration dampers. The volume of such a damping medium compensation chamber amounts to approximately 1360 to 2270 mm³, depending on the type of vehicle. The separating piston can execute a displacement movement even under a low pressure load. The displacement movement of the separating piston already starts at a significantly lower pressure level than the opening movement of a damping valve. This operating behaviour is typical of an amplitude-dependent damping force characteristic.

DE 10 2015 2218 490 A1 discloses a vibration damper which has a pump assembly in which an accumulator device is connected to a flow connection between two working chambers. A pump assembly having two delivery directions is incorporated in this flow connection. The accumulator device has a pressure preload, which is designed to assist the pumping device in the delivery operation. The accumulator volume is correspondingly large. If the pumping function is not required for the vibration damper, the pumping device can fill the accumulator device and put it under pressure.

A basic problem of vibration dampers with a pump assembly is the generation of noise due to a pulsating delivery of the pump assembly. Although a gear pump is used in many cases, operating noise of the pump can be heard, particularly during a relatively long cornering process in conjunction with low excitation on the part of the roadway surface.

One solution involves separating the pumping device spatially from the vibration damper and introducing noise insulation. Noise insulation could be achieved, for example, by very soft bearing locations of the vibration damper. However, this also entails a loss with regard to the response behaviour of the vibration damper. In the case of evasive maneuvers of the vehicle, this characteristic is clearly noticeable.

What is needed is optimization of an influence of the pulsation of the pumping device on noise emissions into the vehicle interior.

SUMMARY

The present disclosure is directed to arranging at least one pulsation accumulator within a flow connection in addition to at least one compensating reservoir, wherein a volume and spring rate of the pulsation accumulator is matched to a frequency of a fluctuation of a delivery volume.

The pulsation accumulator leads to a reduction in noise since there is now a defined elasticity, and cylinders of the vibration damper are not excited by the pulsation of the pump assembly. A pulsation accumulator is significantly smaller than a compensating reservoir or hydraulic backlash as typically used in the cited prior art. Assuming, for example, a piston rod diameter of 17 mm and a travel of 100 mm, the compensating reservoir must have a minimum working volume of approximately 22690 mm³. With a piston rod diameter of 17 mm and a working travel of 6 mm of a separating piston, a hydraulic backlash of approx. 1360 mm³ is calculated. The working volume of the pulsation accumulator is of the order of about 5 to 15 mm³. Consequently, the pulsation damper is a very compact component which, moreover, forms almost no dead element or backlash for the hydraulic system.

According to one exemplary arrangement, the vibration damper has a separate pulsation accumulator for each working chamber. This arrangement allows the effect of pulsation to be minimized for both delivery directions of the pump assembly.

As a further exemplary arrangement of the disclosure, the pulsation accumulator has two accumulator chambers, which are separated from one another by a separating piston, and in each case one accumulator chamber is connected to in each case one working chamber of the working cylinder. In principle, it is also possible for two separate pulsation accumulators to be provided, but the flow paths and the complexity of construction are simplified by combination.

In order to simplify generation of a restoring force for the separating piston, the accumulator chamber is connected to a delivery side of the pump assembly and to a suction-side working chamber of the vibration damper. Even in the suction-side working chamber, there is always an excess pressure with respect to the atmospheric pressure. For this reason, the forces of, for example, a return spring and the hydraulic restoring force are added together, based on the working pressure in the suction-side working chamber. As a result, the return spring can be made weaker.

In order to optimize the response behaviour of the pulsation accumulator, the separating piston of the pulsation accumulator has a gap seal between the accumulator chamber and a rear chamber. A leakage rate at the separating piston is deliberately allowed in order to minimize the static friction of the separating piston.

In order to simplify the dimensioning of a return spring for the separating piston, the separating piston of the pulsation accumulator has a stop, by which the maximum working volume of the accumulator chamber is determined. The working volume is not considered to be a total volume of the pulsation accumulator but rather a product of a top side area of the separating piston×a working travel of the separating piston.

A further measure for minimizing noise emissions includes that the at least one pulsation accumulator is embodied in a housing of the pump assembly. This provides the shortest possible connection of the pulsation accumulator, so that structure-borne noise cannot be transmitted from the pump assembly to other components at all, and therefore the transmitting components, such as, for example, hose connections, cannot execute any expansion movements.

With a view to a compact arrangement and simple flow paths within the pump assembly, the pump assembly has one outlet chamber for each conveying direction, which chambers are arranged next to one another in the housing, wherein the pulsation accumulator is arranged within the housing in a lateral region which is common to the outlet chambers.

In one exemplary arrangement, the pulsation accumulator is aligned in a manner radially offset with respect to a principal axis of the housing in order to keep an overall length of the housing as small as possible.

As a further measure in this respect, in one exemplary arrangement, the pump assembly has a pump chamber whose base area extends at right angles to a principal axis of the pump assembly, wherein the pulsation accumulator is arranged in a plane parallel to the base area.

Optionally, provision can be made for the at least one flow connection between the pulsation accumulator and the pump assembly to be adjustable in its cross section by a valve. In the case of particularly low or very high delivery capacities of the pump assembly, the pulsation effect does not affect noise emissions since the noise frequency does not occur in a disturbing manner in the vehicle. With a view to optimum dynamics of the system, the pulsation accumulator can be deactivated, for example. However, a restriction can also be set, with the result that the pulsation accumulator only cuts off the peaks of the pulsation and can therefore be designed to be smaller than if no valve were present.

BRIEF DESCRIPTION OF DRAWINGS

The disclosure will be explained in greater detail with reference to the following description of the figures, of which:

FIG. 2 shows an alternative variant to FIG. 1;

FIG. 3 shows a pulsation accumulator according to FIG. 1 as an individual part;

FIGS. 4-7 show pulsation accumulators within a pump assembly; and

DETAILED DESCRIPTION

Figure 1:
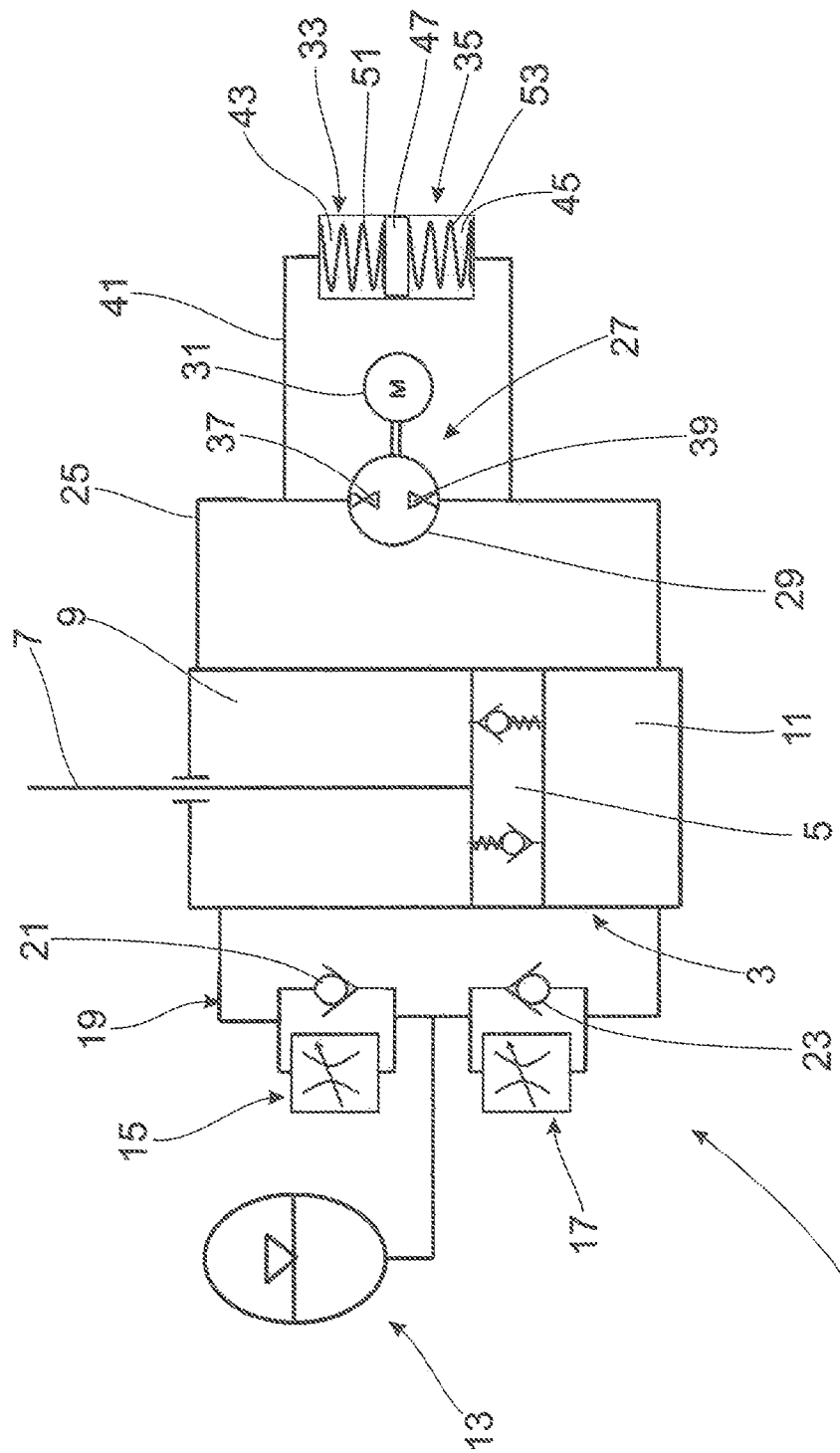
FIG. 1 shows an equivalent diagram of a vibration damper having a pump assembly.

FIG. 1 shows an equivalent diagram for a vibration damper 1 having a working cylinder 3, which is subdivided by an axially movable piston 5 on a piston rod 7 into a first and a second working chamber 9; 11 filled with a damping medium. It is irrelevant here whether this is a single-tube or double-tube vibration damper known per se. The vibration damper 1 has at least one compensating reservoir 13 for receiving the damping medium displaced by the piston rod 7. In this exemplary arrangement, the compensating reservoir 13 is arranged functionally between two adjustable damping valves 15; 17, wherein, in an outflow direction from the adjustable damping valves 15; 17, the compensating reservoir 13 is connected to a flow connection 19 between the two working chambers 9; 11. By way of example, a non-return valve 21; 23 is connected hydraulically in parallel with each adjustable damping valve 15; 17, with the result that the adjustable damping valves 15; 17 generate a damping force only for one operating direction of the vibration damper 1. There is absolutely no need for the adjustable damping valves 15; 17 to be arranged in a manner spatially separate from the working cylinder 3.

Between the two working chambers 9; 11 there is a further flow connection 25, in which a pump assembly 27 comprising a pump 29 and a pump drive 31 is incorporated. The further flow connection 25 need not necessarily be set up in a manner completely spatially separate from the first flow connection 19 with the adjustable damping valves 15; 17.

The pump assembly 27 comprises an alternately conveying pump 29, in one exemplary arrangement, a gear pump. In many types of pumps, there is a fluctuation in the delivery volume despite a constant power supply. This fluctuation leads to noises, which can be transmitted to a vehicle body (not illustrated). In order to minimize these noises, at least one pulsation accumulator 33 is arranged within the further flow connection 25 in addition to the at least one compensating reservoir 13, the volume and spring rate of the pulsation accumulator being matched to the frequency of the fluctuation of the delivery volume of the pump assembly 27.

As can be seen from the equivalent diagram, the pump assembly 27 has two delivery directions in order to selectively fill both working chambers 9; 11 with additional damping medium volume or to maintain only an operating pressure. For this reason, the vibration damper 1 has a separate pulsation accumulator 33; 35 for each working chamber 9; 11. The pulsation accumulator 33; 35 is connected hydraulically in parallel with a delivery chamber 37; 39 of the pump 29 in a third flow connection 41. In this equivalent diagram, the pulsation accumulators 33; 35 have two accumulator chambers 43; 45, which are separated from one another by a separating piston 47. Thus, two pulsation accumulators 33; 35 are arranged in a common housing 49. One accumulator chamber 43; 45 each is connected to one working chamber 9; 11 of the working cylinder 3. A return spring 51; 53 is clamped on both sides of the separating piston 47. Thus, starting from the delivery chamber of the pump, a hydraulic pressure force acts on the separating piston 47, wherein this pressure force is based on a pressure level as in the connected working chamber 9; 11. However, the pulsation accumulator 33; 35 also has a connection via the flow connection to the suction chamber within the vibration damper 1, that is to say the chamber from which the pump assembly 27 delivers during instantaneous operation. Thus, in addition to the return spring 51; 53, the separating piston 47 is acted upon by a pressure force based on the pressure level of the suction chamber. Consequently, the return spring 51; 53 can be dimensioned to be significantly weaker than if the pressure force contribution of the suction chamber were omitted. The return springs 51; 53 are designed in such a way that the differential pressure which the pump 29 builds up is supported.

To optimize the response behaviour of the pulsation accumulator 33; 35, the separating piston 47 of the pulsation accumulators 33; 35 has a gap seal 55 between the accumulator chamber 43 and a rear chamber 57 in which the return spring 51; 53 is arranged. In the case of a combination of two pulsation accumulators 33; 35, each of the two chambers is an accumulator chamber or a rear chamber, depending on the operating direction. Furthermore, the separating piston 47 is made of plastic. With the associated reduction in mass, the natural frequency of the pulsation accumulators 33, 35 is to be raised to a speed or delivery range which is not reached by the pump in normal operation or is selectively not approached.

FIG. 2 shows that there is no need at all for the two pulsation accumulators 33; 35 to be spatially connected to one another. The choice between the two variants depends on the installation space conditions in the specific application. The advantage of this variant is that the return springs 51; 53 have no reciprocal dependency with respect to their spring forces.

FIG. 3 shows the pulsation accumulator according to FIG. 1 as an individual part. The separating piston 47 is mounted in an axially movable manner in the housing 49. The separating piston 47 has a T-shaped cross section, wherein end faces 59; 61 each define a stop for the maximum displacement travel of the separating piston 47 within the pulsation accumulators 33; 35 and thus also the maximum working volume of the accumulator chamber. The working volume is calculated from the outer annular space multiplied by the maximum displacement travel of the separating piston 47 starting from an initial position with an inactive pump assembly 27. Therefore, the total storage volume of the housing 49 can be significantly larger in order to still obtain installation space for the return spring 51; 53. The return spring 51; 53 is clamped in each working direction between a bottom 63; 65 of the housing 47 and a circumferential flange 67, which forms the separating piston 47.

It is advantageous to design the return springs in such a way that, in the central position, that is to say when the pump has not built up any differential pressure, they do not exert any preloading force on the separating piston. As a result, only the rigidity of a return spring is relevant for each pressure direction. A rigidity which is as low as possible improves the insulation behaviour of the device. In the case of mutually preloaded return springs, the total stiffness would be relevant and the insulating effect would be impaired.

At least two connections 69 for the flow connection 41 to the pump 29 are provided in the housing 47.

Viewing FIGS. 4 to 7 together shows a design example of a pump assembly 27 in which at least one pulsation accumulator 33; 35 is embodied in a housing 71 of the pump assembly 27. In FIGS. 4 and 5, the pump drive 31 has been omitted in order to simplify the illustration. The pump chamber 75 of the pump 29 is arranged in a housing end section 73 (FIG. 5). The bearing locations 77; 79 for one of the gears (not illustrated) of the pump designed as a gear pump can be seen. The suction chamber and the delivery chamber are to be regarded as the pump chamber 75.

In the plan view according to FIG. 7, the bearing location 77 of one of the gears used can be seen. The outer surface of the pump chamber 75 forms a bearing location for the other gear of the pump. A first transverse axis of the housing 71 extends vertically within the sectional plane through the bearing location 77. A second transverse axis 85 extends at right angles thereto through the bearing location 77. The two transverse axes 83; 85 separate four quadrants within the sectioned plane in FIG. 7. The pump assembly 27 has one outlet chamber 87; 89 for each delivery direction. A first outlet chamber 87 extends within the first and fourth quadrants Q1; Q4. A second outlet chamber is arranged mirror-inverted with respect to the second transverse axis 85 and extends within the second and the third quadrant Q2; Q3. Consequently, the two outlet chambers 87; 89 are arranged next to one another in the housing 71. The housing region for the pulsation accumulator, which is formed by the housing of the pump assembly, is arranged in a lateral region which is common to the outlet chambers, namely the first and the second quadrant Q1; Q2. The pulsation accumulators 33, 35 are thus aligned in a manner radially offset with respect to a principal axis 91 of the housing 71. The principal axis is formed by the longitudinal axis of the pump assembly 27, which in turn has the same alignment as the bearing locations 77; 79 for the gears of the pump. As can be clearly seen, the flow connection 41 between the pulsation accumulator 33; 35 and the outlet chambers 87; 89 is formed by very short straight channels which can be produced very easily. In addition, the pulsation accumulators 33; 35 are placed in a very stable cover region of the pump assembly 27, thus ensuring that no relevant vibrations of the housing walls can occur. Viewing FIGS. 4 and 7 together, it is clear that the pump chamber 75, which also comprises the two outlet chambers 87; 89, extends with its base surface at right angles to the drive axis or to the principal axis 91 of the pump assembly 27, wherein the pulsation accumulators 33; 35 are arranged in a plane parallel to the base surface of the pump chamber 75.

Figure 8:
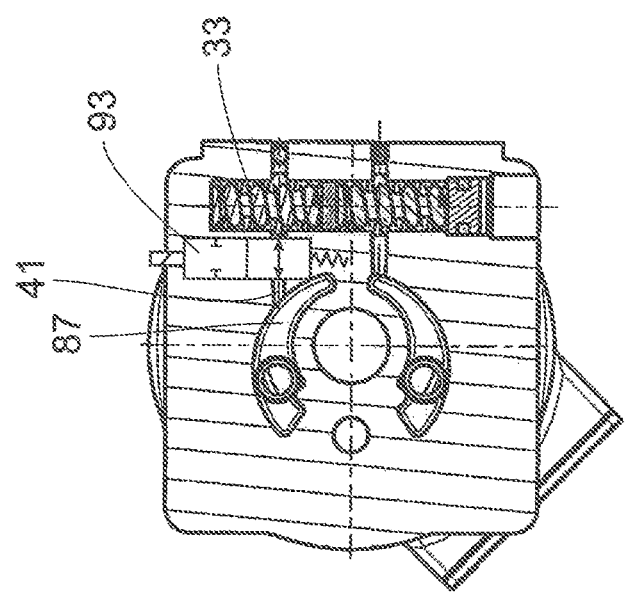
FIG. 8 shows an alternative variant based on FIG. 7.

FIG. 8 is based on the illustration according to FIG. 7. In addition, the pump assembly 27 has a valve 93 for setting the cross section of the flow connection 41 between the pulsation accumulator 33 and the outlet chamber 87. In the case of a combined arrangement of the two pulsation accumulators 33; 35, a single valve 23 is sufficient. In this way, the inflow to the pulsation accumulator can be controlled for one delivery direction of the pump assembly 27 and the outflow from the pulsation accumulator can be controlled for the other delivery direction. The control can optionally be configured as an on/off valve or as a continuously adjustable valve. This enables the pulsation accumulator 33; 35 to be deactivated or its influence reduced when it is not required.

The invention claimed is:

1. A vibration damper comprising a working cylinder, which is subdivided by an axially movable piston on a piston rod into a first and a second working chamber filled with a damping medium, wherein the vibration damper has at least one compensating reservoir for receiving the damping medium displaced by the piston rod, wherein there is a flow connection between the first and second working chambers, in which connection there is incorporated a pump assembly, which has a fluctuation in a delivery volume with a constant power supply, wherein, in addition to the at least one compensating reservoir, at least one pulsation accumulator is arranged within the flow connection, the volume and spring rate of the pulsation accumulator being matched to the frequency of the fluctuation of the delivery volume of the pump assembly, wherein the at least one pulsation accumulator is embodied in a housing of the pump assembly, wherein the pump assembly has one outlet chamber for each conveying direction, which outlet chambers are arranged next to one another in the housing, wherein the pulsation accumulator is arranged within the housing in a lateral region which is common to the outlet chambers, wherein the pulsation accumulator is aligned in a manner radially offset with respect to a principal axis of the housing.

2. The vibration damper according to claim 1, wherein the vibration damper has a separate pulsation accumulator for each of the first and second working chambers.

3. The vibration damper of claim 2, wherein the pulsation accumulator has two accumulator chambers that are separated from one another by a separating piston, and in each case one accumulator chamber is connected to in each case one of the first and second working chambers of the working cylinder.

4. The vibration damper according to claim 3, wherein the accumulator chamber is connected to a delivery side of the pump assembly and to a suction-side working chamber of the vibration damper.

5. The vibration damper according to claim 2, wherein the separating piston of the pulsation accumulator has a gap seal between the accumulator chamber and a rear chamber.

6. The vibration damper according to claim 2, wherein the separating piston of the pulsation accumulator has a stop, by which a maximum working volume of the accumulator chamber is determined.

7. The vibration damper according to claim 1, wherein the pulsation accumulator has two accumulator chambers that are separated from one another by a separating piston, and in each case one accumulator chamber is connected to in each case one of the first and second working chambers of the working cylinder.

8. The vibration damper according to claim 7, wherein the accumulator chamber is connected to a delivery side of the pump assembly and to a suction-side working chamber of the vibration damper.

9. The vibration damper according to claim 7, wherein a return spring is clamped on both sides of the separating piston.

10. The vibration damper according to claim 1 wherein a separating piston of the pulsation accumulator has a gap seal between the accumulator chamber and a rear chamber.

11. The vibration damper according to claim 1, wherein a separating piston of the pulsation accumulator has a stop, by which a maximum working volume of the accumulator chamber is determined.

12. The vibration damper according to claim 1, wherein the pump assembly has a pump chamber whose base area extends at right angles to a principal axis of the pump assembly, wherein the pulsation accumulator is arranged in a plane parallel to the base area.

13. The vibration damper according to claim 1, wherein at least one flow connection between the pulsation accumulator and the pump assembly is adjustable in its cross section by means of a valve.

14. The vibration damper according to claim 1, wherein the compensating reservoir is arranged functionally between two adjustable damping valves.

15. The vibration damper according to claim 14, further comprising a non-return valve connection hydraulically in parallel with each adjustable damping valve such that the adjustable damping valves generate a damping force only for one operation direction of the vibration damper.

16. The vibration damper according to claim 1, wherein the pulsation accumulator is connection hydraulically in parallel with a delivery chamber of a pump in a flow connection.

17. The vibration damper according to claim 1, wherein the pump assembly has two delivery directions to selectively fill both working chambers with additional damping medium volume.

18. A vibration damper comprising a working cylinder, which is subdivided by an axially movable piston on a piston rod into a first and a second working chamber filled with a damping medium, wherein the vibration damper has at least one compensating reservoir for receiving the damping medium displaced by the piston rod, wherein there is a flow connection between the first and second working chambers, in which connection there is incorporated a pump assembly, which has a fluctuation in a delivery volume with a constant power supply, wherein, in addition to the at least one compensating reservoir, at least one pulsation accumulator is arranged within the flow connection, the volume and spring rate of the pulsation accumulator being matched to the frequency of the fluctuation of the delivery volume of the pump assembly, wherein the at least one pulsation accumulator is embodied in a housing of the pump assembly, wherein the pump assembly has one outlet chamber for each conveying direction, which outlet chambers are arranged next to one another in the housing, wherein the pulsation accumulator is arranged within the housing in a lateral region which is common to the outlet chambers, wherein the pump assembly has a pump chamber whose base area extends at right angles to a principal axis of the pump assembly, wherein the pulsation accumulator is arranged in a plane parallel to the base area.

* * * * *